(12) United States Patent
Christopher

(10) Patent No.: US 12,485,835 B2
(45) Date of Patent: Dec. 2, 2025

(54) DISPLAY HEALTH CHECK SYSTEM FOR A DIGITAL LICENSE PLATE

(71) Applicant: REVIVERMX, INC., Granite Bay, CA (US)

(72) Inventor: Mason Todd Christopher, Granite Bay, CA (US)

(73) Assignee: REVIVERMX, INC., Granite Bay, CA (US)

( * ) Notice: Subject to any disclaimer, the term of this patent is extended or adjusted under 35 U.S.C. 154(b) by 0 days.

(21) Appl. No.: 18/766,453

(22) Filed: Jul. 8, 2024

(65) Prior Publication Data

US 2024/0359641 A1  Oct. 31, 2024

Related U.S. Application Data

(63) Continuation of application No. 18/018,849, filed on Jan. 30, 2023, now Pat. No. 12,030,439.

(51) Int. Cl.
| | |
|---|---|
| *B60R 13/10* | (2006.01) |
| *B60R 16/03* | (2006.01) |
| *G09F 9/30* | (2006.01) |
| *G09F 9/37* | (2006.01) |
| *G09F 21/04* | (2006.01) |
| *G09G 3/00* | (2006.01) |
| *G09G 3/20* | (2006.01) |

(52) U.S. Cl.
CPC ............ *B60R 13/105* (2013.01); *B60R 16/03* (2013.01); *G09F 9/30* (2013.01); *G09F 21/048* (2013.01); *G09G 3/006* (2013.01); *G09G 3/20* (2013.01); *G09F 9/372* (2013.01); *G09G 2330/12* (2013.01); *G09G 2370/16* (2013.01); *G09G 2380/10* (2013.01)

(58) Field of Classification Search
CPC ....... B60R 13/105; B60R 13/10; B60R 16/03; G09F 9/30; G09F 9/372; G09F 21/048; G09G 3/006; G09G 3/20; G09G 2330/12; G09G 2370/16; G09G 2380/10
See application file for complete search history.

(56) References Cited

U.S. PATENT DOCUMENTS

| | | | | |
|---|---|---|---|---|
| 2011/0078933 | A1* | 4/2011 | Lukawitz | B60Q 1/545 713/168 |
| 2013/0311794 | A1* | 11/2013 | Stewart | H04W 52/0264 713/300 |
| 2015/0283939 | A1* | 10/2015 | Parkes | B60Q 1/544 340/468 |
| 2020/0244951 | A1* | 7/2020 | Holloway | H04N 23/54 |

* cited by examiner

*Primary Examiner* — Brent D Castiaux
(74) *Attorney, Agent, or Firm* — Innovent Law P.C.; Karima Gulick

(57) ABSTRACT

A digital license plate comprising includes a display system capable of showing a first image and a power supply rail connected to the display system. A display controller is provided with a data connection to the display system and arranged to measure at least one of power consumption and impedance of the power supply rail. The display controller is further configured to prevent sending a second image to the display system if display failure is indicated by measured power consumption or impedance as being below a defined threshold.

20 Claims, 11 Drawing Sheets

700

900

DISPLAY HEALTH CHECK SYSTEM FOR A DIGITAL LICENSE PLATE

TECHNICAL FIELD

The present disclosure relates to vehicle mounted exterior displays, and more specifically to digital license plates with displays monitored for damage or error.

BACKGROUND

Conventional stamped license plates for vehicles have long been used, despite difficulties in updating license numbers and their susceptibility to theft or alteration. Instead of stamped license plates, a dynamic display that presents vehicle identification and registration information can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate.

However, digital systems with dynamic displays operate under adverse conditions capable of damaging display functionality, including vehicle impact accidents, vibration, dust, or thrown gravel, cold and extremely hot conditions capable of damaging or rendering inoperable a display. Systems and methods for detecting failure of license number display are needed.

SUMMARY

A digital license plate comprising includes a display system capable of showing a first image and a power supply rail connected to the display system. A display controller is provided with a data connection to the display system and arranged to measure at least one of power consumption and impedance of the power supply rail. The display controller is further configured to prevent sending a second image to the display system if display failure is indicated by measured power consumption or impedance as being below a defined threshold.

In another embodiment, method of operating a digital license plate includes the steps of displaying a first image and measuring at least one of power consumption and impedance of a power supply rail. In the event of a display malfunction or error, a second image is prevented from being sent to the display system if display failure is indicated by measured power consumption or impedance as being below a defined threshold.

In some embodiment, display failures can be counted. A real time clock can be used to associate time with impact as measured by an inertial measurement unit. Display failure, as well as data and time related to impact, can be wirelessly communicated with a user or a cloud. In some embodiments the first image is displayed on a bistable display, and typically includes a license plate number.

In another embodiment, a method of operating a digital license plate includes the steps of receiving a display update request for a display and measuring at least one of power consumption and impedance of a power supply rail connected to the display. If display failure has occurred as indicated by measured power consumption or impedance as being below a defined threshold, the requested display update is aborted, allowing the first image of a license plate number to remain.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
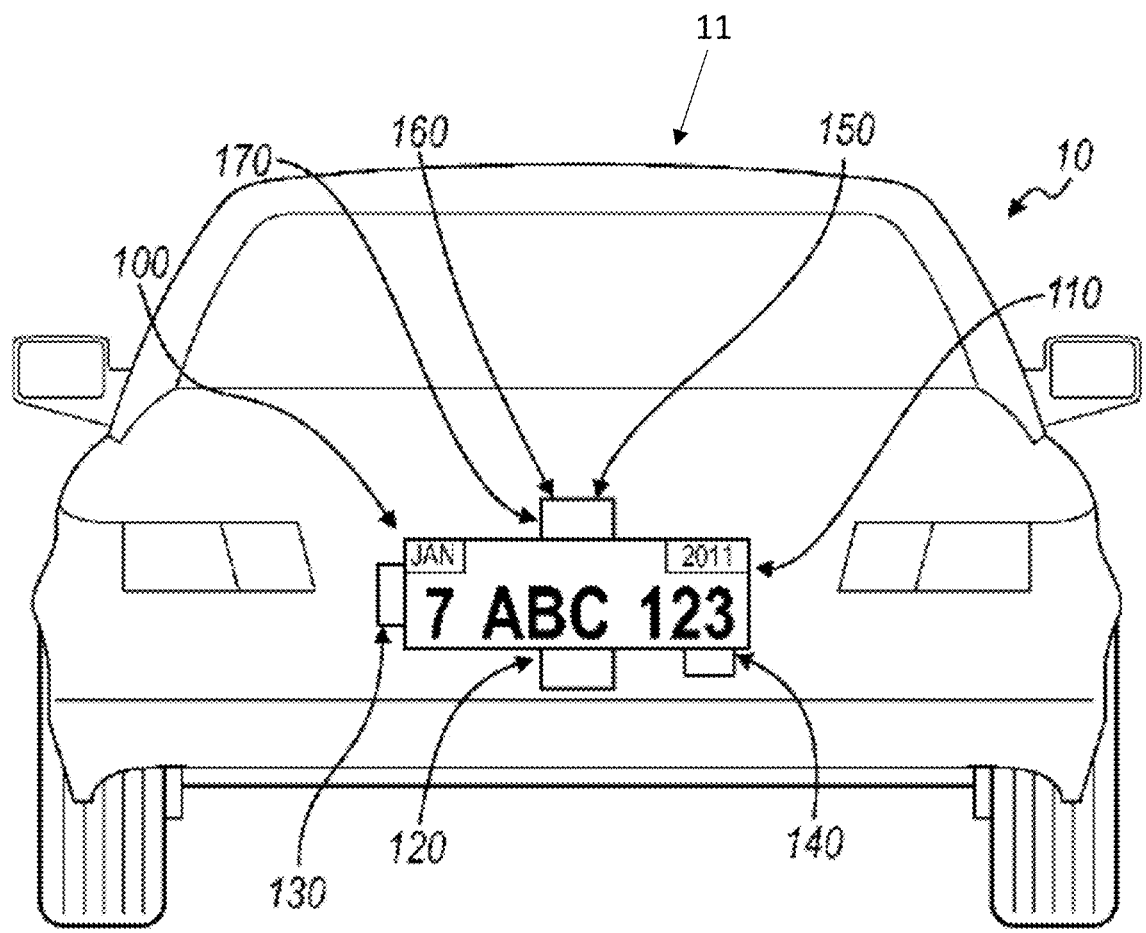
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
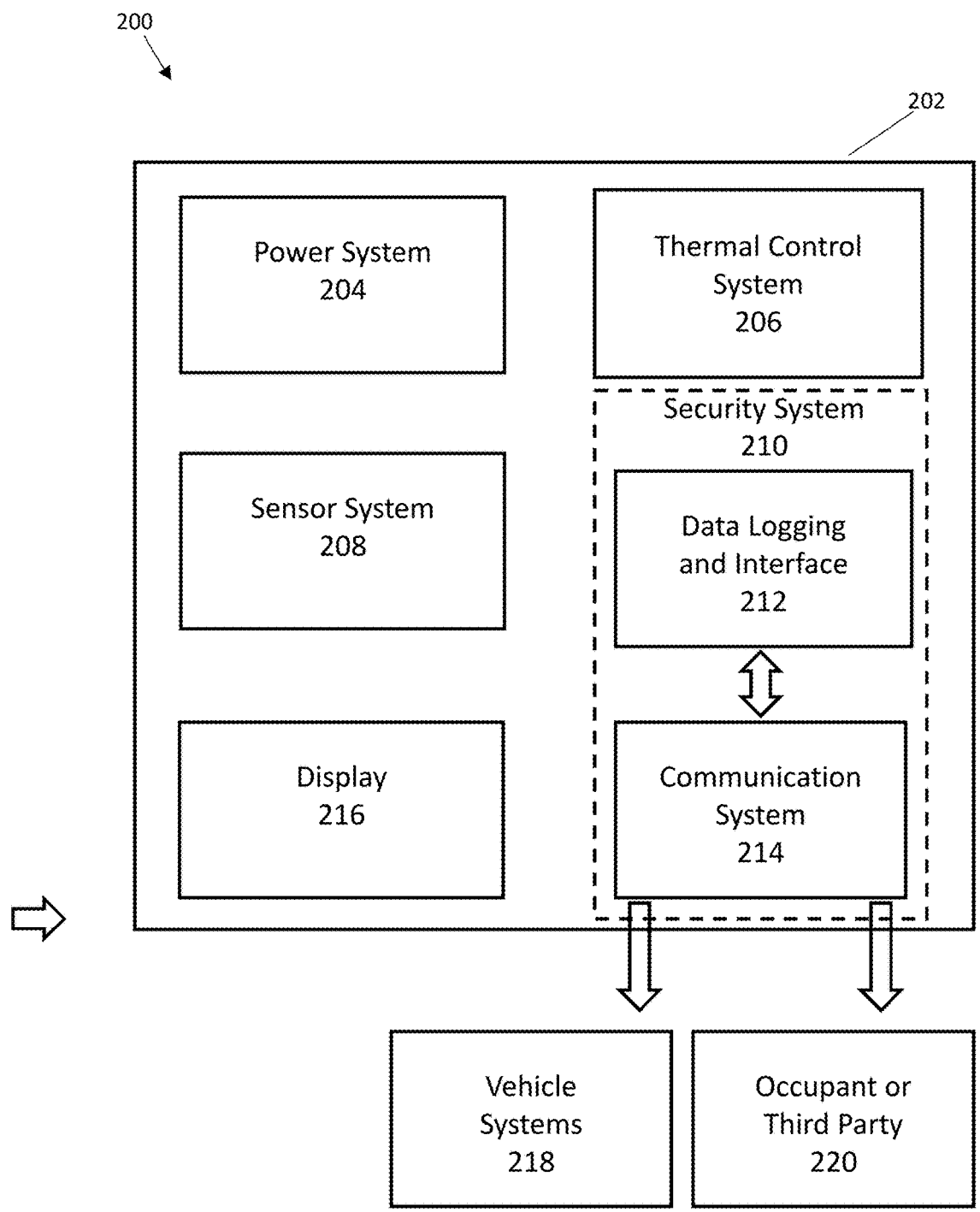
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
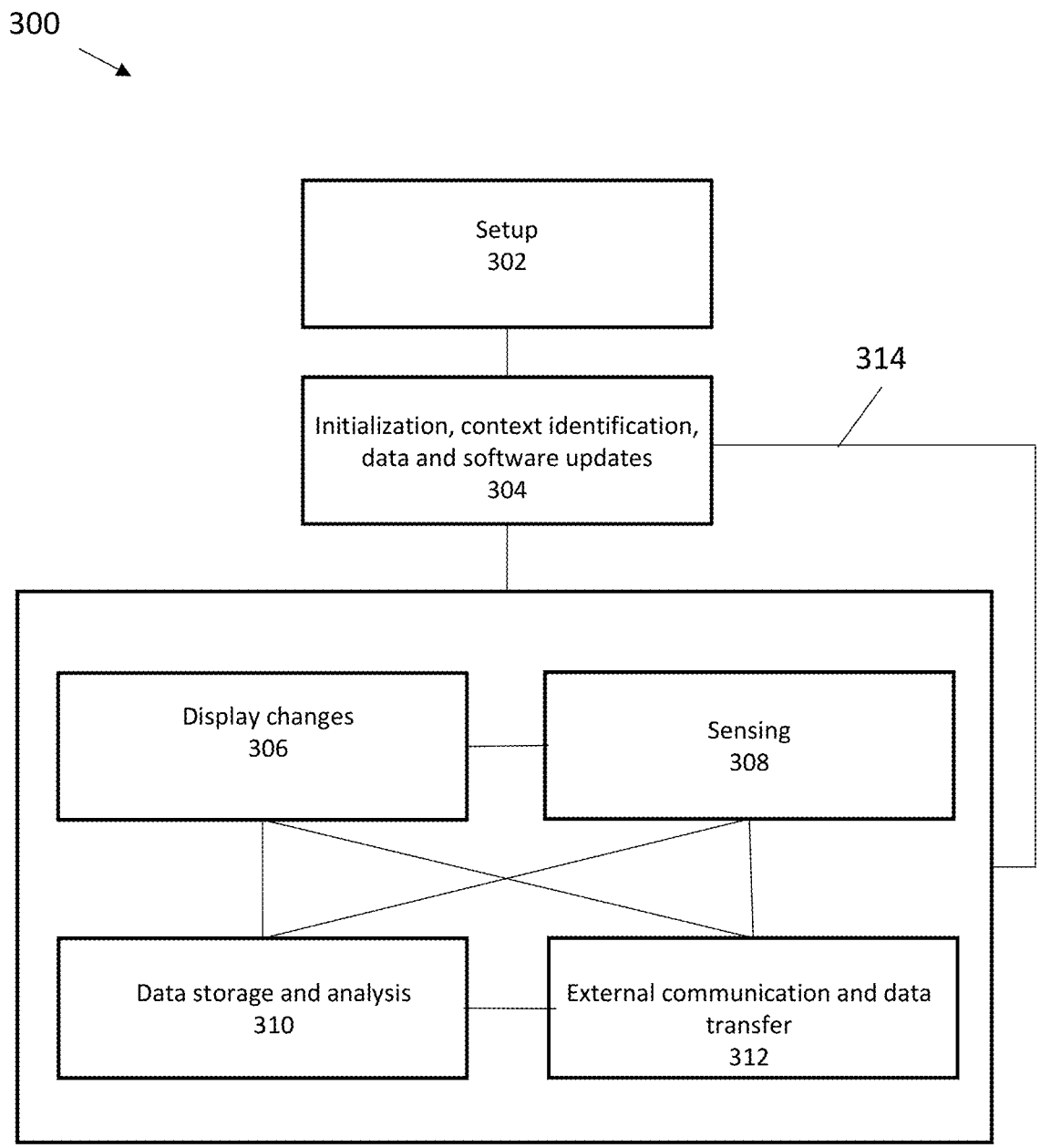
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4:
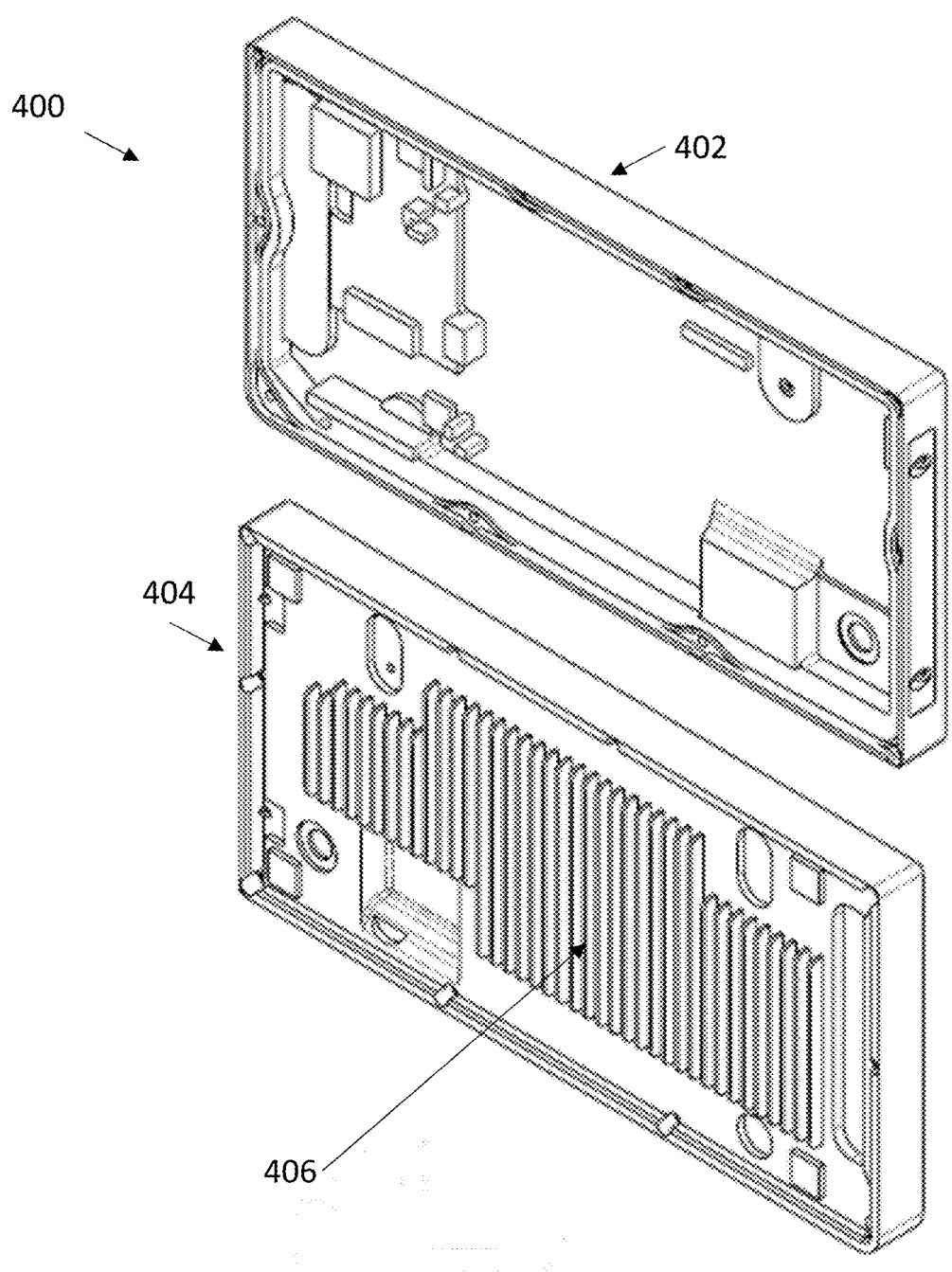
FIG. 4 depicts two views of a bezel.

FIG. 4 depicts two views 400 of a bezel, illustrating cooling fins. The view 400 in FIG. 4 shows a bezel 402 that functions as a frame surrounding digital display 110. 404 is an alternate view of bezel 402, showing a set of cooling fins 406. Cooling fins 406 function to radiate heat away from digital display 110, thereby helping reduce the heating rate associated with digital display 110.

In some embodiments, heat conduits may be included as a part of bezel 402, where heat conduits contact circuit board components directly to funnel heat away, and may also include some sort of heat-transfer compound (possibly in the form of a gel or paste) to help with heat conduction. Other embodiments may use thermoelectric cooling (e.g. Peltier devices) to provide active cooling for display system 110.

A suitable thermal control system such as discussed briefly with respect to FIG. 2 is also useful for ensuring reliable operation under a range of conditions. As discussed with respect to FIG. 1, display system 100 may be mounted on the exterior of a vehicle, and may be subject to a range of temperatures. Furthermore, display system 100 generates heat due to power dissipation in the associated components such as display 110. In some conditions, it might be important to prevent display system 100 from overheating. One strategy to regulate the amount of heat generated is to reduce the brightness of display 110 in accordance with the detected temperature associated with display system 100.

In some embodiments, digital display 110 may be a bistable display. Under low operating temperatures, a bistable display may need to be externally heated for the bistable display to correctly transition. Under high operating temperatures, there can be difficulties in switching unless the bistable display is maintained below a defined temperature, or at least temporarily cooled. Due to the differences in the operating temperatures of bistable displays and an LCD, temperature controls might be programmed differently with the bistable display versus the LCD.

Figure 5:
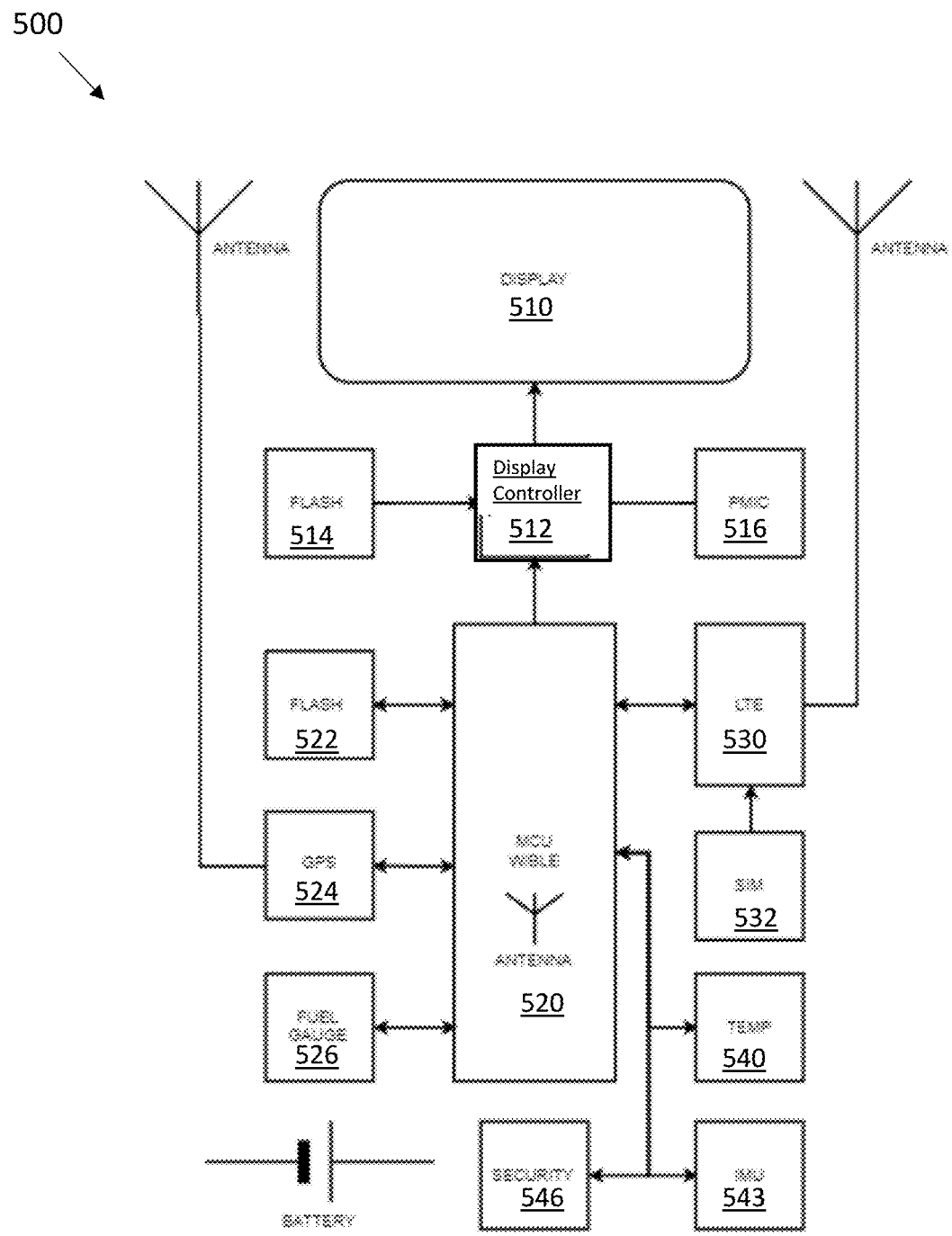
FIG. 5 illustrates an alternative digital license plate system.

FIG. 5 is an alternative embodiment of a digital license plate system 500 including a display 510 and display controller 512. The display controller 512 is connected to flash memory 514 for storing status and image related data, and a power management integrated circuit 516 to control and measure power provided to the display 510. The display controller 512 is connected to a master control unit 520 (MCU) for processing various communication, sensing, and control activities of the system 500. Connected modules include flash memory 522, GPS 524, fuel gauge 526, temperature sensor 540, inertial measurement unit 543, and security/antitheft monitors, sensors and locks 546. Communication can be provided by an LTE wireless system 530 using an associated SIM card 532.

Figure 6:
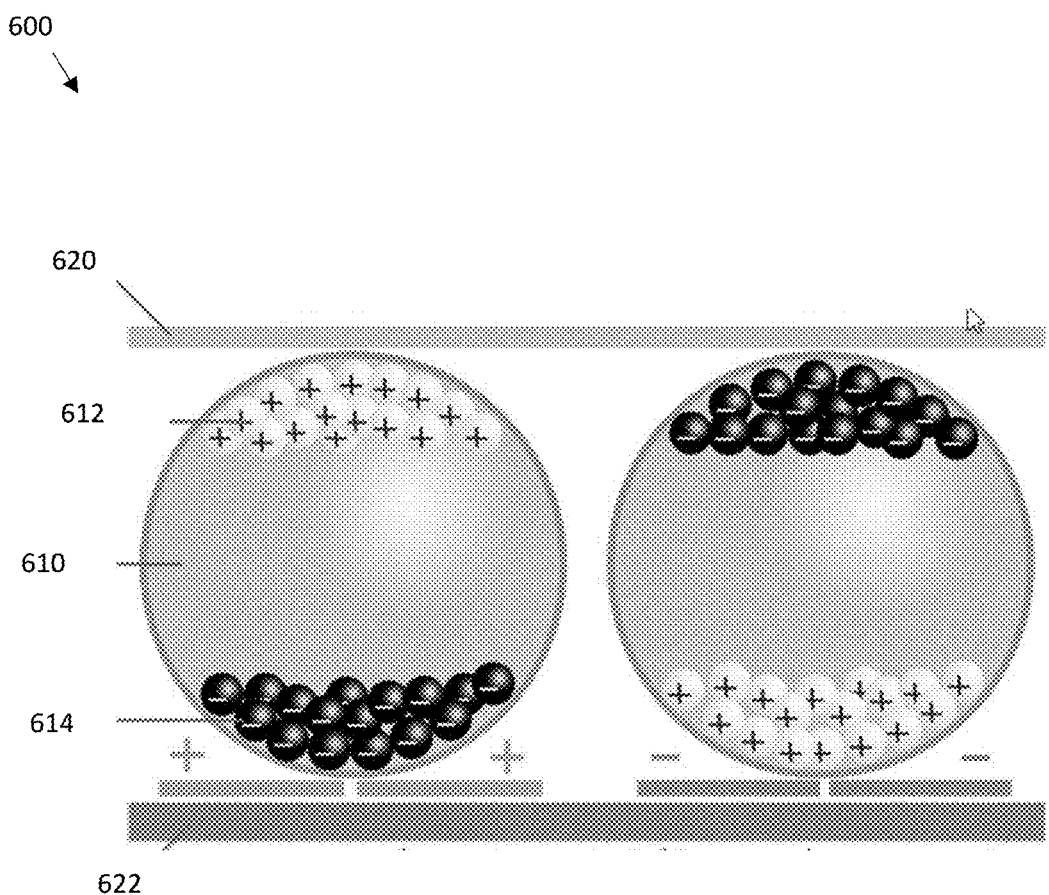
FIG. 6 illustrates bistable display components.

FIG. 6 is a cartoon detail 600 of pigmented microspheres in an electrophoretic display containing white and black pigment material. Such bistable displays are commonly available from E Ink Corporation, and as illustrated in FIG. 6, include a microsphere 610 containing a transparent oil, positively charged white pigments 612 and negatively charged black pigments 614. Bistable switching of the microsphere 610 orientation is enabled by transparent electrode 620 and addressable pixel electrodes 622.

Alternative embodiments using only a single pigment material and a colored oil are also possible. In those embodiments, the electrophoretic dispersion has one type of charged pigment particles dispersed in an oil or oil mixture of a contrasting color. When a voltage difference is created between the transparent electrode 620 and the pixel electrode 622, the pigment particles migrate electrode of polarity opposite that of the pigment particles. The color showing at the transparent electrode 620 may be either the color of the solvent or the color of the pigment particles. Reversal of electrode polarity will cause the particles to migrate back to the opposite pixel electrode 622, thereby reversing the color.

Performance of such bistable displays can be improved for digital license plates such as discussed herein. For example, to improve readability, white pigment particles can be formed from, or associated with, materials that reflect infrared light. This improves readability using infrared sensitive camera systems. In another embodiment, for improved twilight or low light readability, the white pigment particles can be formed from, or associated with, materials that fluoresce or are phosphorescent. In still other embodiments, the white pigment particles can be formed from, or associated with, heat rejecting or heat absorbing materials that reduce or increase temperature to help maintain the bistable display of the digital license plate within operational temperature limits.

Under low operating temperatures, a bistable display may need to be externally heated for the bistable display to correctly transition. At low temperatures, the e-ink may need an external source of heat in order for it to be able to transition, since the lower bound of its operating temperature range is higher than LCDs. Attached heating elements, heating pipes, battery or vehicle powered heating elements can all be used to ensure that the bistable display is maintained or temporarily brought above the minimum display switching temperature when switching is required. Use of a heating element allows, for example, activation of a heater to bring the display above the minimum display switching temperature, followed by deactivation of the heater and consequent drop in temperature below the minimum display switching temperature. Other components that might be heated other than the bistable display may include any associated circuit boards, and the battery system.

For embodiments without associated heaters (or when the heater does not generate sufficient heat to compensate for cold temperatures), operation of the bistable display can be adjusted to compensate. For example, in one embodiment, as temperature is reduced near to a lower operational temperature limit, the digital license plate can be set to display only the legally required information. Advertisements that could interfere with display of legally required information or dynamic displays that could partially or completely fail to switch due to cold temperatures would not be allowed. In effect, for example, a vehicle maintained in a heated garage would be able to display the full range of visual effects possible in the digital license plate. If the vehicle moves into an environment with sub-zero temperatures, a temperature sensor could provide warning data of low temperature conditions, the digital license plate would switch to a display of only the legally required information or information that would not interfere with viewing of the legally required information. Similarly, embodiments that with active or passive cooling systems can support methods to ensure that the digital license plate will switch to a display of only the legally required information or information that would not interfere with viewing of the legally required information before temperatures reach a maximum display switching temperature.

Critical temperatures vary according to material and type of display. For example, an e-ink bistable display may have a normal operating temperature range above 0 degrees Celsius and below 50 degrees Celsius. Actions to compensate for low or high heat conditions can begin before a critical temperature is reached. For example, a display pattern that impacts reflectivity can be adjusted to increase reflectivity as the sensed temperature increases above 40 degrees Celsius. Optional cooling elements can be activated if the temperature continues to increase, and the display can be locked into a non-switching state if temperature continues to rise, with the digital license plate acting to display only the legally required information or information that would not interfere with viewing of the legally required information. Similarly, at low temperatures, display pattern (reflectivity) can be adjusted to decrease reflectivity (i.e. increase absorption) as the sensed temperature decreases below 10 degrees Celsius. Optional heating elements can be activated if the temperature continues to decrease, and the display can be locked into a non-switching state if temperature continues to fall, with the digital license plate acting to display only the legally required information or information that would not interfere with viewing of the legally required information. Typically, actions taken to compensate for high or low heat conditions begin within 15, 10, or 5 degrees Celsius of the critical temperature, and can be ordered so that actions requiring little or no power or having a low visual impact are implemented before actions requiring a substantial amount of power or having a greater impact on display messaging are implemented.

As will be understood, temperature of a display can be directly or indirectly measured. Electronic thermometers with associated temperature control modules can be attached to the display, attached near or in the vicinity of the display, or attached somewhere on a vehicle. Ambient temperatures can be measured, and an indirect determination of likely display temperature can be made. In certain embodiments, predicted temperatures can be used. For example, if the digital license plate receives predicted or calculated overnight temperature information, protective measures can be immediately engaged when the vehicle is parked near the end of a day. While not as accurate as direct measurement of the display temperature, ambient or other indirect temperature measurement can be accurate enough to engage protective measures when needed as critical temperatures are approached.

In one embodiment, a display system supporting modifiable heat relevant display parameters includes a temperature sensor positioned to measure temperature of the display system. A temperature control module can be connected to the temperature sensor and configured to modify heat relevant display parameters as critical temperatures are approached. Modifiable heat relevant display parameter includes brightness, with brightness being increased as critical low temperatures are approached and decreased as critical high temperatures are approached. In another embodiment, the modifiable heat relevant display parameter includes a displayed pattern to modify reflectivity, with the displayed pattern being modified to increase heat absorption as critical low temperatures are approached and modified to decrease heat absorption as critical high temperatures are approached.

Figure 7:
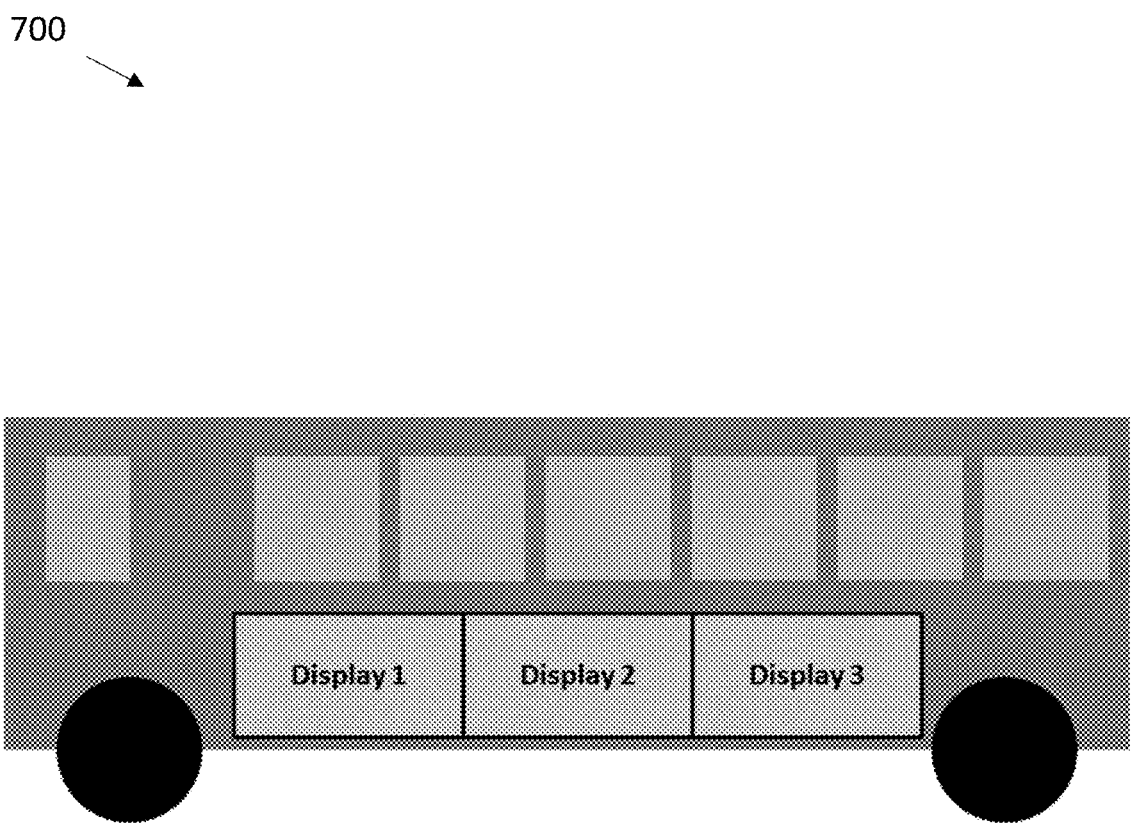
FIG. 7 illustrates positioning of multiple displays on a vehicle.

Applications of display system are not limited only to vehicle license plates. For example, the display can be composed of multiple homogeneous tiles, a large heterogenous display with inset tiles (e.g. a bistable or electrophoretic display with LED display sections), or have distinct color and bistable sections. In addition, the display system can control multiple additional displays positioned on the interior or exterior of a vehicle. For example, such displays may be tiled and placed on the side of a bus, as shown in FIG. 7. Tiling displays may increase the number of options available to present media to an intended audience. The example illustrated in FIG. 4 shows the displays 700 placed on the side of a bus; a similar set of tiled displays may be implemented on the back of the bus as well. The systems and methods described herein can all be extended to include display ensembles as shown in FIG. 7.

Some embodiments include a larger display (say 16"×16" for example), a portion of which can show the plate image, while the rest can be used for static messaging. This way messages and plate image can be displayed simultaneously.

Figure 8:
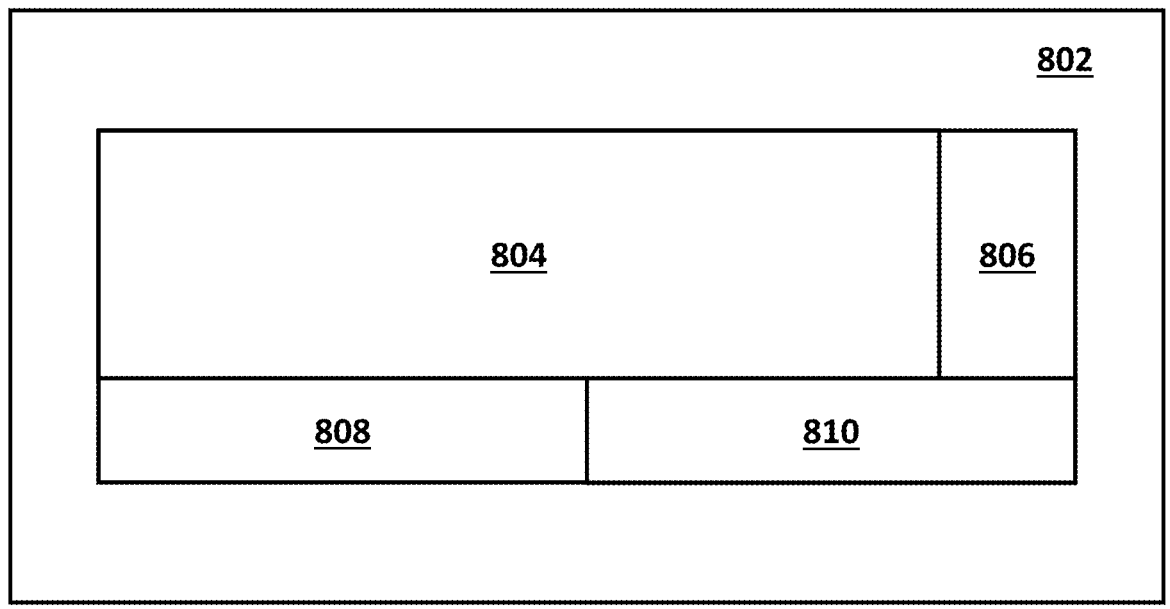
FIG. 8 illustrates multiple sub-displays.

FIG. 8 is a diagram illustrating a display 800 comprised of multiple sub-displays. In some embodiments, a display may be comprised of sub-displays of similar or different kinds tiled together. As seen in FIG. 8, display 800 may have an outer frame display 802, an inner sub-display 804, an inner sub-display 806, an inner sub-display 808 and an inner sub-display 810. Outer frame display 802 and inner sub-display 804-810 may be configured to display different media content. For example, outer frame display 802 may be configured to display vehicle license and registration information, while sub-display 804-810 may display different advertising and/or promotional messages. In one embodiment, sub-display 806 could be, for example, a color OLED display able to accurately display a replica of a colored annual registration sticker. In other embodiments, outer frame display 802 and sub-display 804-810 may be comprised of different display kinds. For example, outer frame display 802 may be a bistable display, sub-display 804 may be an OLED display, sub-display 806 may be an LCD display, and sub-display 808-810 may each be a bistable display.

Measures to prevent display system from damage from road debris or similar hazards may include physical protective covers made from, for example, Plexiglas or sapphire crystal. Hydrophobic coatings may also be applied to the exterior surface of display system to prevent damage due to exposure to liquids such as water. In other embodiments, self-cleaning glass using nanocrystalline titanium dioxide coatings, plasma-chemical roughening, photo-catalytic cleaning structures, molded polymeric layers, or other suitable hydrophobic or hydrophilic system can be used. Thermal protection can be provided by an IR-blocking coating. The display system may also be integrated into the vehicle structure itself. For example, a curved or flexible display may be used to conform aesthetically to a vehicle design. An embodiment of display system 100 may, for example, be conformably integrated into a bumper of a vehicle.

Figure 9:
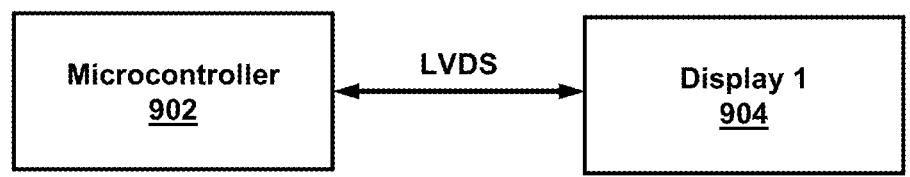
FIG. 9 illustrates multiple types of displays.
Figure 9:
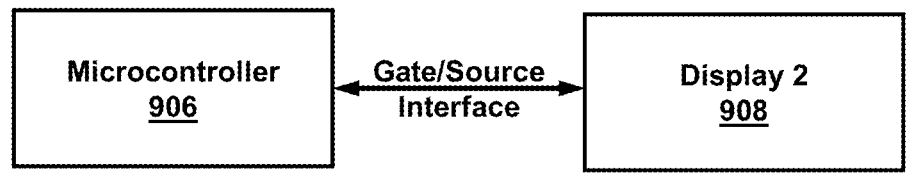
Figure 9:
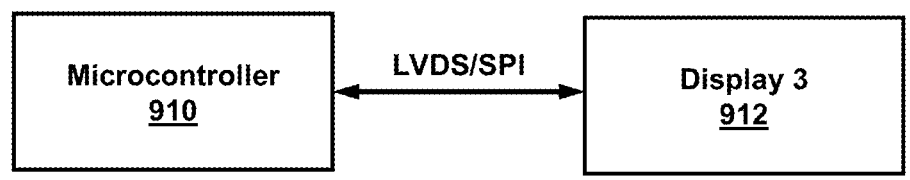

FIG. 9 is a block diagram 900 illustrating display communication protocols. In some embodiments, low voltage differential signaling (LVDS) communication interface may be implemented between a microcontroller 902 and a display 1 904. In other embodiments, a gate/source interface may be implemented between a microcontroller 906 and a display 2 908. In still other embodiments, a low voltage differential signaling or serial peripheral interface (LVDS/SPI) communication interface may be implemented between a microcontroller 910 and a display 3 912. In some embodiments, other display communication technologies such as HDMI may be used to implement the communication link between the processing device and the display device, where the processing device may be a microcontroller such as microcontroller 902 or any other suitable processing device such as a microprocessor, a digital signal processor, a field-programmable gate array and so on.

Display 1 904, display 2 908, and display 3 912 may be any of an LCD display, a TFT LCD display with and LED backlight, a bistable display with a front LED light, or any other suitable display. Any combination of signaling methods may be used to communicate between a microcontroller and a display, including LVDS, SPI, parallel port interface, serial port interface, RS232, and so on. In certain embodiments, one or more displays controlled by the foregoing discussed signaling methods and protocols can be positioned at a distance from the digital license plate, either within or on the exterior of the vehicle.

Figure 10:
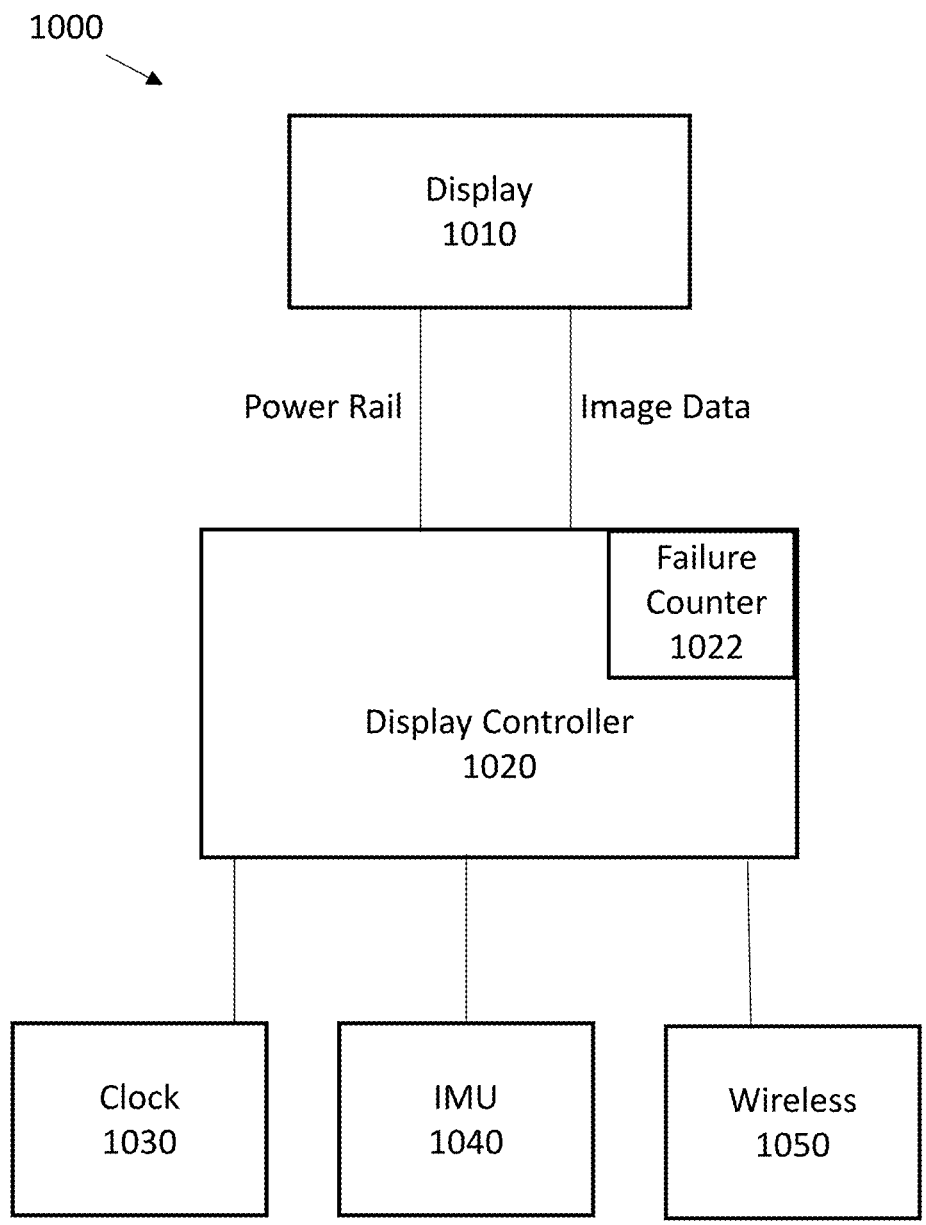
FIG. 10 illustrates an embodiment of a digital license plate with a display failure system.

FIG. 10 illustrates an embodiment of a digital license plate system 1000 with a display failure system. Such a system is particularly useful in conjunction with previously described bistable displays 1010 that provided a license plate number. In many instances, a damaged display 1010 will still provide a recognizable image of, for example, a license plate number. Refreshing the display image prior to presenting a new image could result in a corrupted or unreadable license plate number.

In some embodiments, before electronic display update by display controller 1020 with new image data, impedance and/or current consumption of power rail(s) are measured for the display 1010. Based on defined "pass" criteria thresholds, an electronic display sequence is initiated; based on "fail" criteria thresholds, the display update sequence is aborted, retaining previous "pass" display image. Unique failures can be counted with a failure counter 1022 and are stored for tracking or troubleshooting purposes. Unique failures can also be associated with an inertial measurement unit 1040 (IMU) that can include a gyroscope, accelerometer or other motion related sensor able to sense possible impacts. Time of display failure or time of unusual motion related events can be determined using a real time clock 1030. This data can be sent using a wireless module 1050 to a user, server system, or cloud network. Based on received information, replacement digital licenses can be automatically ordered, warranty coverage determined, and failure modes understood.

Figure 11:
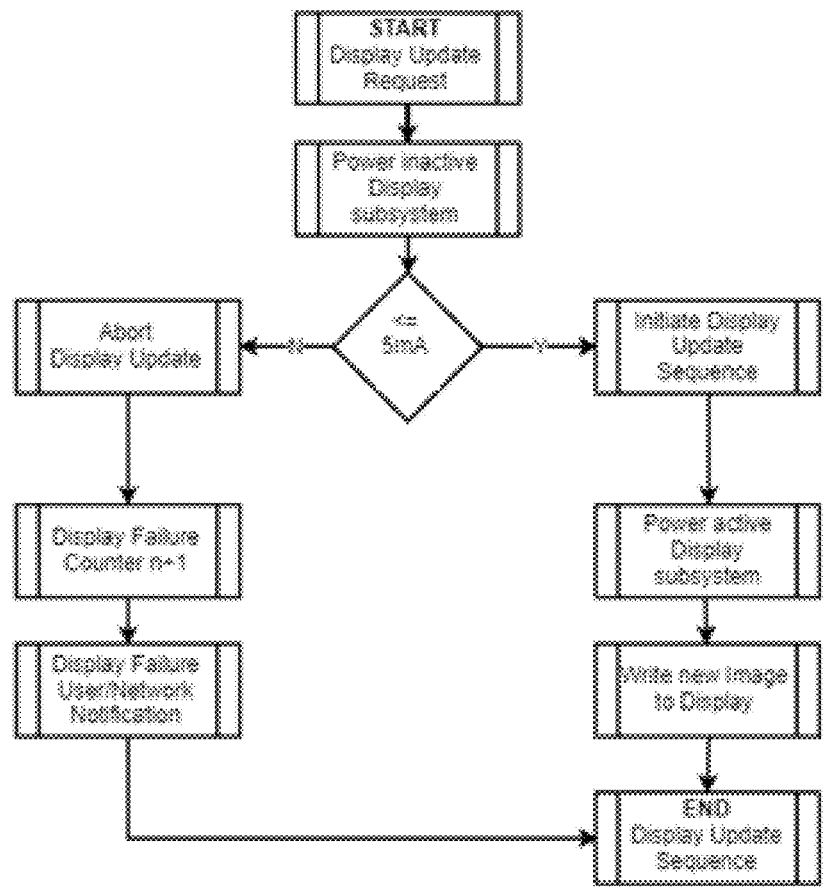
FIG. 11 illustrates one method for operating a display failure system.

FIG. 11 illustrates one method 1100 for operating a display failure system. A display update request is made to a power inactive display. Measurements of power draw or impedance are made, and if, for example, power draw is less than or equal to 5 mA, the display update is aborted. A display failure counter is incremented, and notification can be provided to a user or cloud network of the failure, with the display update sequence ending. Alternatively, if measurements of power draw or impedance are made, and power draw is greater than 5 mA, the display update is initiated, the display fully powered and readied for a new image write. After a successful write, the display update sequence ends.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate comprising:
a display system;
a first sensor unit configured to measure at least one first parameter associated with the display system; and
a display controller having a data connection to the display system and connected to the sensor unit to receive the first parameter and the display system, the display controller has a first failure threshold for determining whether the first parameter indicates that a display system failure has occurred, the display controller is configured to manipulate at least one function of the display system if a display failure based on impact damage to the display system is indicated by the first parameter as being exceeding a first failure threshold.

2. The digital license plate of claim 1, further comprising a second sensor unit configured to measure a second parameter associated with the display system, the display controller being connected to the second sensor unit to receive the second parameter and having a second failure threshold for determining whether the second parameter indicates that a display system failure has occurred, the display controller is configured to manipulate at least one function of the display system if a display failure is indicated by one of the parameters as being exceeding the associated failure threshold.

3. The digital license plate of claim 1, further comprising a display failure counter for recording a number of times that the display system failure is determined by the display controller to occur.

4. The digital license plate of claim 1, further comprising a real time clock for recording a time of display system failure is determined by the display controller to occur.

5. The digital license plate of claim 1, wherein the display system is configured to show a first image, the display controller prevents sending a second image to the display system if a display failure is indicated by the first parameter as being exceeding a first failure threshold.

6. The digital license plate of claim 5, wherein the first sensor unit includes power supply rail connected to the display system for measuring at least one of the power consumption and impedance of the display system; the display controller determines a display failure occurs to the display system if the measured power consumption or impedance exceed the associated failure threshold.

7. The digital license plate of claim 5, wherein the first sensor unit an inertial measurement unit able to record impact on the display system; the display controller determines a display failure occurs to the display system if the measured impact exceed the associated first failure threshold.

8. The digital license plate of claim 1, further comprising a wireless connection to transmit the first parameter and a time of measuring the first parameter to an external device.

9. A method of operating a digital license plate comprising the steps of:
measuring at least a first parameter associated with a display system using a first sensor unit; and
manipulating at least one function of the display system if display failure based on impact damage to the display system is indicated by the measured first parameter as being below a defined first failure threshold.

10. The method of claim 9, further comprising:
measuring a second parameter associated with the display system using a second sensor unit; and
manipulating at least one function of the display system if a display failure is indicated by one of the parameters as being exceeding the associated failure threshold.

11. The method of claim 9, further comprising recording a number of times that the display system failure is determined to occur.

12. The method of claim 9, further comprising recording a time of display system failure determined to have occurred.

13. The method of claim 9, wherein the step of measuring the first parameter includes connecting a power supply rail to the display system to measure at least one of the power consumption and impedance of the display system.

14. The method of claim 9, further comprising:
displaying a first image using the display system; and
preventing sending a second image to the display system if a display failure is indicated by the first parameter as being exceeding a first failure threshold.

15. The method of claim 9, wherein the step of measuring the first parameter includes using an inertial measurement unit to record impact on the display system.

16. The digital license plate of claim 9, further comprising wirelessly transmitting the first parameter and a time of measuring the first parameter to an external device.

17. A method of operating a digital license plate comprising the steps of:
receiving a display update request for a display system;
measuring at least a first parameter associated with the display system using a first sensor unit; and
if display failure based on impact damage to the display system has occurred as indicated by measured first parameter as being below a defined first failure threshold, abort requested display update.

18. The method of operating a digital license plate of claim 17, further comprising:
measuring a second parameter associated with the display system using a second sensor unit; and
if display failure has occurred as indicated by at least one of the measured first parameter and the second parameter as being exceeding the associated threshold, abort requested display update.

19. The method of operating a digital license plate of claim 17, further comprising the step of incrementing a display counter if display failure has occurred.

20. The method of operating a digital license plate of claim 17, further comprising recording a time of display system failure determined to have occurred.

* * * * *